Figure 3:
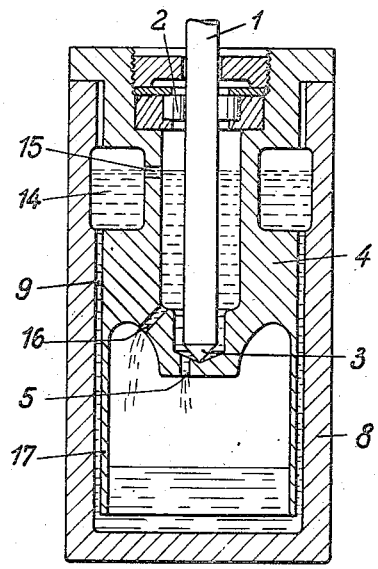

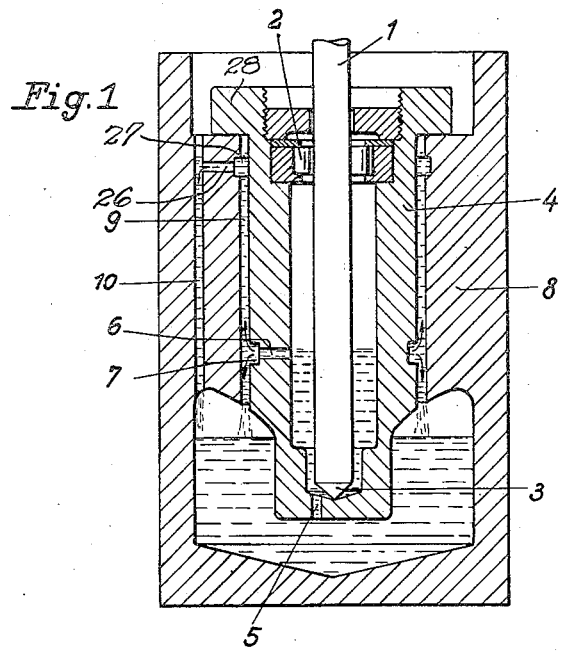
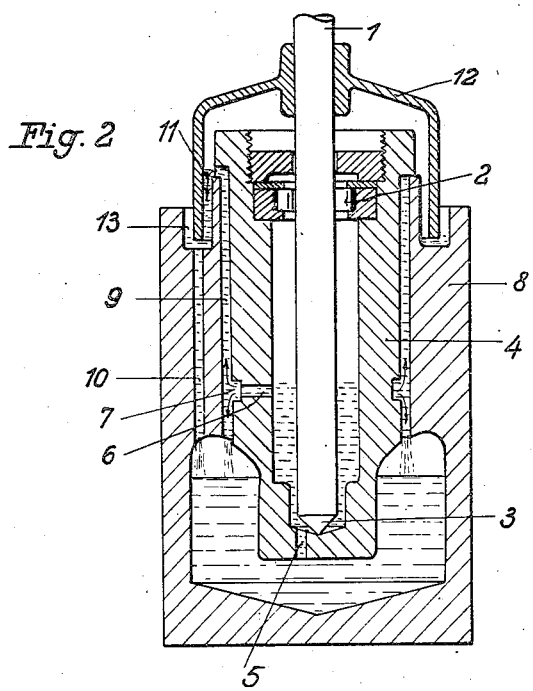

June 26, 1934.   J. RAIBLE   1,964,140
FLOATING BEARING
Filed March 12, 1930   2 Sheets-Sheet 2

Inventor:
Julius Raible
by Kirschbaum Atty.

Patented June 26, 1934

1,964,140

UNITED STATES PATENT OFFICE 1,964,140

FLOATING BEARING

Julius Raible, Stuttgart, Germany, assignor to Vereinigte Kugellagerfabriken A.-G., Berlin, Germany, a corporation Application March 12, 1930, Serial No. 435,214
In Germany March 14, 1929

5 Claims. (Cl. 308—169)

My invention refers to floating bearings, and more particularly to damping means for such bearings.

It is an object of my invention to improve such means.

To this end I provide a floating bearing sleeve in a suitable casing in which it is fitted to be displaced radially, an anti-friction bearing in the sleeve, and a shaft mounted to rotate in the anti-friction bearing, and provide means for circulating a damping fluid independently of the anti-friction bearing.

Shafts, and particularly comparatively thin spindles which may be arranged in vertical or inclined position, have a critical range or ranges before attaining their normal velocity, and must not undergo excessive vibration, are supported in not less than one yielding or floating bearing. In textile machinery this arrangement of spindles or shafts is known as "flexible". The most convenient arrangement is to provide a sleeve for the bearing or bearings of the shaft or spindle and to fit this sleeve in a casing so that it is free to move therein within limits.

This so-called flexible arrangement involves the drawback that due to the impossibility of completely balancing all disturbing forces on the rotary parts vibrations and knocking occur throughout the velocity range and that the contacting faces of the bearing and the casing are subjected to wear.

It has already been suggested to separate the contacting faces by the oil for lubricating the bearings and in spindles or shafts having a normal step and a normal radial bearing the oil is forced up in the bearing sleeve and returned to the casing, for the major part through the radial bearing. This system involves the drawbacks that a considerable percentage of the power for rotating the shafts or spindles is consumed for pumping the oil and that the damping action of the oil which penetrates between the sleeve and the casing is insufficient because the co-operating areas must be small, as the oil must flow back as soon as possible. The object of the clearance between the sleeve and the casing, in fact, is principally to effect a rapid return flow of the oil and therefore there is practically no damping action. Another drawback is that the oil contains metal particles from the insufficiently lubricated contacting faces of the sleeve and the casing and that this objectionable oil is continuously circulated for lubricating the bearings.

In connection with anti-friction bearings it has never been attempted to effect damping at the contacting faces of the sleeve and the casing. The difficulties here are even greater than for normal bearings, for anti-friction bearings must not be flooded with oil as excessive oiling and clogging are very detrimental to such bearings. Moreover, excessive oiling causes whirling which balances the major part of the friction-reducing properties of the anti-friction bearing.

Insufficient damping, particularly in highly stressed parts, causes vibration, knocking and wear at the sleeve and the casing and in most cases rust forms which makes still worse the drawbacks already present.

Anti-friction bearings are the only elements which may be safely operated at high velocities and loads and the impossibility of providing suitable damping without sacrificing their good properties, is often very serious.

Springs absorb vibrations without shocks but are unable to damp them. The case is similar to that of the bearing springs in motor cars in which it has been found necessary to provide shock absorbers.

These drawbacks are eliminated according to my invention by circulating the damping fluid or lubricant independently of the anti-friction bearing so that the bearing is not flooded and the power demand is not increased by whirling. The damping liquid, for instance oil, leaves the bearing sleeve before getting to the anti-friction bearing and is conducted to ample damping surfaces in such manner that the vibrations are converted into energy in the liquid.

This may be effected by supplying the damping fluid for a shaft only to the lower part of the damping surfaces from which point it is moved upwards by the cooperation of vibration and capillary attraction. I provide a casing and a sleeve in the casing in which the bearing, or bearings, for the shaft is mounted. The sleeve is inserted in the casing with an annular clearance and is free to move radially in the clearance as the spindle vibrates. The vibrations cause the normally circular clearance to assume the shape of a crescent. A damping liquid which may be a lubricant, is admitted to the clearance from below. Capillary attraction is relied on for elevating the liquid in the clearance. Obviously such capillary attraction is a maximum in the region of the crescent horns and here it becomes so strong that it overcomes gravity and the liquid is drawn up. On the other hand, it decreases toward the body of the crescent until gravity prevails and the liquid flows down. It has been found, however, that the balance is in the favor of the upflow. An effective circulation is thus obtained by utilizing the energy of the vibrations for circulating the liquid, and auxiliaries, with their inevitable loss of power and velocity, are eliminated. The fluid after arriving at the upper end of the sleeve is returned to the casing.

My invention will be found particularly advantageous at high velocity and high loads as under these conditions the disturbing vibration forces are maximum and cause rapid wear and considerable admixing of metal particles to the oil.

In the drawings affixed to this specification and forming part thereof various types of floating bearings to which my invention has been adapted are illustrated diagrammatically in axial section by way of example.

In the drawings

Figure 4:
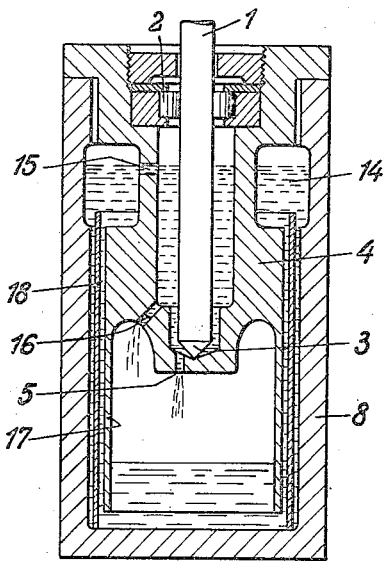
Figure 5:
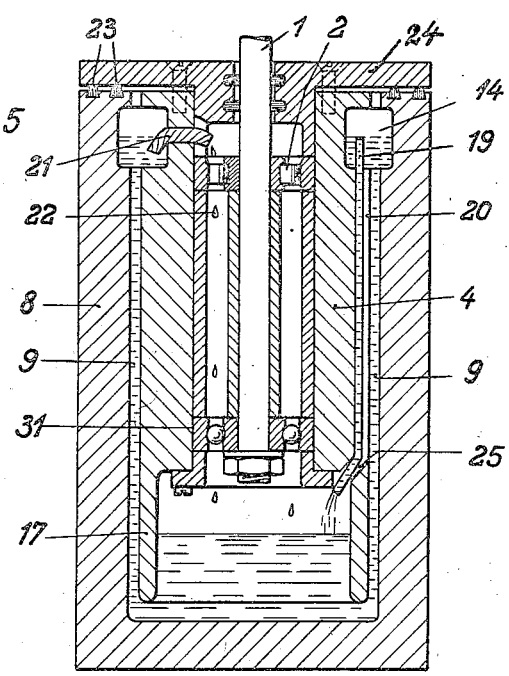

Figs. 1 and 2 illustrate bearings in which the lubricant is raised from a well by the rotation of the shaft, Figs. 3 and 4 illustrate bearings in which a recess is provided in the sleeve above the well, and supplied with liquid from the well through the clearance between the sleeve and the casing, and Fig. 5 illustrates a bearing in which part of the liquid is by-passed to the bearings of the shaft.

Referring now to the drawings, 1 is the shaft, 2 is a radial anti-friction bearing which is here shown as a roller bearing, 4 is the bearing sleeve in which the bearing 2 is arranged, 8 is the casing in which the bearing sleeve 4 is fitted to float, 28 is a flange at the top of the sleeve 4 which bears on the casing 8, and 9 is the clearance between the casing 8 and the sleeve 4, when the sleeve is in its central position.

Referring now to Figs. 1 and 2, 3 is the pointed end of the shaft 1, which is supported in the bottom of the sleeve 4 in the manner of a step bearing, and 5 is a passage through which the oil is lifted from the well in the bottom of the casing 8 and raised to a certain level in the annular space between the shaft and the sleeve by the rapid rotation of the shaft. The oil must not rise as high as the anti-friction bearing 2 and therefore it is conducted to the clearance 9 by a radial passage 6 extending from the annular space to the clearance at a point far below the bearing. 7 is an annular groove at the outer end of the passage 6 which when the sleeve gets into contact with the casing 8 at the side where the passage 6 opens, conducts the oil to the non-obstructed portion of the clearance so that the flow of the oil is not interfered with. The oil in the clearance 9 is forced upwards by the vibrations of the sleeve 4 and the capillary action which results from the formation of the crescent, as described, and finally the balance of the upflowing and the downflowing oil is discharged near the top of the clearance through a radial bore 26 with an annular groove 27 at its inner end and a return passage 10 into which opens the outer end of the radial bore 26.

As described in the introduction, the normally circular section of the clearance 9 assumes the shape of a crescent under the influence of the reciprocation of the sleeve 4 in the casing 8, causing the liquid in the clearance alternately to rise by capillarity and to descend by gravity, as indicated by the oppositely directed arrows at the groove 8. The liquid which descends by gravity, is returned directly to the well at the bottom of the casing 8, and the liquid which is raised by the decrease of the free sectional area at the "crescent horns", is also returned to the well but through the bore 26 and the return passage 10. Both the aforesaid subsidiary circulations are strictly separated from the antifriction bearing 2. The passage 6 which defines the upper level for the gravity-controlled subsidiary circulation is far below the bearing, and the bearing is partitioned from the liquid performing the capillarity-controlled subsidiary circulation in the clearance 9 by the wall of the sleeve 4 in radial direction, and by the flange 28 at the top of the sleeve in axial direction. In this manner, access of liquid to the bearing 2 is effectively prevented.

Bearings for spindles are old in which the spindle is surrounded by a sleeve, the vibrations of the spindle are damped by liquid in a clearance between the sleeve and a casing, and an anti-friction bearing for the spindle is provided, but in these old bearings the liquid in the clearance has free access to the anti-friction bearing at the upper end of the sleeve, and this is just what I avoid by the arrangement described.

The width of the clearance 9, viz. the space between the sleeve 4 and the casing 8 when the sleeve is in its central position, is determined with consideration of the operating conditions and in any case is so large as to prevent metal-to-metal contact of the sleeve and the casing.

It will appear that the flow of oil is altogether apart from the anti-friction bearing 2, this bearing being lubricated sufficiently by the thin layer of oil which adheres to the shaft 1.

The arrangement illustrated in Fig. 2 is similar to that described with reference to Fig. 1 except for the fact that means are provided for preventing loss of oil from the bearing. The arrangement which will be described is old in the art. 12 is a cap extending into an annular recess 13 in the casing 8, and 11 is a passage formed between the inner wall of the cap 12 and the outer wall of the recess 13 which extends beyond the upper face of the casing like a spigot. The oil from the clearance 9 is returned to the well at the bottom of the casing 8 through the passage 10 which is connected with the recess 13.

Referring now to Figs. 3 and 4, the step bearing for the pointed end 3 of the shaft 1 is arranged above the liquid level in the well and the sleeve 4 is provided with a downward extension 17 which extends to below the liquid level in the well. The extension 17 is a hollow cylinder which makes up part of the clearance 9 in which the oil is moved up as described. 14 is an annular recess which is formed partly in the outer wall of the sleeve 4 and partly in the inner wall of the casing 8. The clearance 9 opens into the bottom of the recess 14. 15 is a passage extending from the recess 14 to the annular space within the sleeve 4 below the anti-friction bearing 2. The oil is discharged from the space by means of a passage 16 and by means of the passage 5 described with reference to Figs. 1 and 2 which in this instance is not a suction but a discharge passage.

Referring now particularly to Fig. 4, 18 is a hollow cylinder which is inserted in the clearance 9 between the casing 8 and the sleeve 4 and its extension 17. The hollow cylinder subdivides the clearance into two annular spaces so that the pumping action of the vibrations is exerted in two clearances and at four cylindrical faces instead of a single clearance and two faces as in Figs. 1–3. Any number of cylinders might be provided for subdividing still further the clearance 9.

Referring now to Fig. 5, the step bearing for the end 3 of the shaft 1 is here replaced by an anti-friction bearing 31 which is shown as a ball-bearing, and as, for the reason stated, anti-friction bearings must be kept apart from the circulation of the oil the path on which the oil circulates has been modified. The extension 17 at the lower end of the casing 8, the clearance 9, and the recess 14, are provided as described with reference to Figs. 3 and 4, but the recess 14 is now arranged with its bottom substantially at the level of the upper bearing 2. A passage extends from the recess 14 to the annular space above the bearing 2, and a wick 21 is inserted in the passage. This passage constitutes a by-pass the free area of which may be varied by varying the size, the porosity, or other properties, of the wick 21. Obviously the quantity of oil delivered to the bearing 2 may also be varied by providing more than one passage, each with a wick or the like. In this manner small quantities of oil are supplied to the bearing 2 so that excessive oiling and clogging of the bearing 2 is prevented. The oil from the bearing 2 trickles down to the bearing 31 as indicated by the drops 22 so that both bearings are lubricated reliably, which is particularly important for high speed shafts. 19 is an overflow pipe extending from the recess 14 to the well in the bottom of the casing and inserted in a longitudinal groove 20 of the sleeve and an inclined bore 25 at the root of the extension 17. Any number of over-flow pipes may be provided for removing the bulk of the oil from the recess 14.

24 is a flange at the upper end of the sleeve 4, and 23 are rings inserted in the upper face of the casing which may be of felt so as to yield while providing a tight packing for the flange 24 on the top of the casing 8. Obviously similar means may be provided for the other bearings illustrated, except the bearing Fig. 2 in which loss of oil is prevented by the cap 12.

Preferably means are provided for preventing rotation of the sleeve 4 in the casing 8. This may be effected by pins, not shown, or any other suitable means inserted between the sleeve 4 and the casing 8 so as not to interfere with the radial displacement of the sleeve in the casing. Damping action is increased by making large the damping faces by roughening, recessing, threading, or the like.

I claim:—

1. A floating bearing comprising a casing, a well for the reception of a damping liquid in the bottom of said casing, a bearing sleeve arranged in said casing with a clearance and fitted to move radially within said clearance, an anti-friction bearing near the top, a normal bearing near the bottom, of said sleeve, a shaft mounted to rotate in said bearings, and spaced apart from the inner wall of said sleeve, a passage connecting said well with said normal bearing, and a passage connecting the space defined by the inner wall of said sleeve and said shaft with said clearance, said casing having a return-flow passage connecting said clearance with said well and said passages being arranged apart from said anti-friction bearing.

2. A floating bearing comprising a casing, a well for the reception of a damping fluid in the bottom of said casing, a bearing sleeve arranged in said casing with a clearance and fitted to move radially within said clearance, an antifriction bearing near the top, a normal bearing near the bottom, of said sleeve, a shaft mounted to rotate in said bearings, and spaced apart from the inner wall of said sleeve, a passage connecting said well with said normal bearing, a passage connecting the space defined by the inner wall of said sleeve and said shaft with said clearance, said casing having a return-flow passage connecting said clearance with said well, and a cap on said shaft fitted to rotate therewith and constituting part of said return-flow passage, said passages being arranged apart from said antifriction bearing.

3. A floating bearing comprising a casing, a well for the reception of a damping liquid in the bottom of said casing, a bearing sleeve arranged in said casing above said well with a clearance and fitted to move radially within said casing, an antifriction bearing near the top, a normal bearing near the bottom of said sleeve, a shaft mounted to rotate in said bearings and spaced apart from the inner-wall of said sleeve, a downward extension projecting from said sleeve into said well, passages extending downwardly from said normal bearing and the space defined by the inner wall of said sleeve and said shaft toward said well, a recess in its outer wall connected with said clearance, and a passage extending from said space to said recess, said passages being arranged apart from said antifriction bearing.

4. A floating bearing comprising a casing, a well for the reception of a damping liquid in the bottom of said casing, a bearing sleeve arranged in said casing with a clearance and fitted to move radially within said clearance, an antifriction bearing near the top, a normal bearing near the bottom of said sleeve, a shaft mounted to rotate in said bearings, and spaced apart from the inner wall of said sleeve, a passage connecting said well with said normal bearing, and a passage arranged below said antifriction bearing and connecting the space defined by the inner wall of said sleeve and said shaft, with said clearance, said casing having a return-flow passage connecting said clearance with said well.

5. A floating bearing comprising a casing, a well for the reception of a damping liquid in the bottom of said casing, a bearing sleeve arranged in said casing with a clearance and fitted to move radially within said clearance, an anti-friction bearing near the top, a normal bearing near the bottom of said sleeve below the liquid level in said well, a shaft mounted to rotate in said bearings, and spaced apart from the inner wall of said sleeve, that portion of the space defined by the inner wall of said sleeve which is in the vicinity of said normal bearing, being reduced, a passage connecting said well with said reduced portion, and a passage connecting the space defined by the inner wall of said sleeve and said shaft with said clearance, said casing having a return-flow passage connecting said clearance with said well.

JULIUS RAIBLE.